United States Patent
Nordbruch

(10) Patent No.: US 10,558,210 B2
(45) Date of Patent: Feb. 11, 2020

(54) METHOD AND DEVICE FOR OPERATING A PARKED MOTOR VEHICLE

(71) Applicant: Robert Bosch GmbH, Stuttgart (DE)

(72) Inventor: Stefan Nordbruch, Kornwestheim (DE)

(73) Assignee: Robert Bosch GmbH, Stuttgart (DE)

( * ) Notice: Subject to any disclaimer, the term of this patent is extended or adjusted under 35 U.S.C. 154(b) by 127 days.

(21) Appl. No.: 15/850,378

(22) Filed: Dec. 21, 2017

(65) Prior Publication Data

US 2018/0196423 A1    Jul. 12, 2018

(30) Foreign Application Priority Data

Jan. 9, 2017 (DE) .......................... 10 2017 200 165

(51) Int. Cl.
*G05D 1/00* (2006.01)
*H04N 7/18* (2006.01)
(Continued)

(52) U.S. Cl.
CPC ........... *G05D 1/0038* (2013.01); *B60W 30/00* (2013.01); *G05D 1/0022* (2013.01); *H04N 5/232* (2013.01);
(Continued)

(58) Field of Classification Search
CPC ..... F16H 61/0213; B60K 28/16; B60K 28/00; B60K 28/02; B60K 28/06; B60K 28/066; B60K 28/14; B60W 10/10; B60W 30/143; B60W 10/06; B60W 10/18; B60W 2520/28; B60W 2710/105; B60W 2540/06; B60W 2540/10; B60W 2540/103;
(Continued)

(56) References Cited

U.S. PATENT DOCUMENTS 5,801,618 A    9/1998    Jenkins
6,172,599 B1   1/2001    Bothen
(Continued)

FOREIGN PATENT DOCUMENTS

CN    103171517 A    6/2013
CN    105416233 A    3/2016
(Continued)

*Primary Examiner* — Richard A Goldman
(74) *Attorney, Agent, or Firm* — Norton Rose Fulbright US LLP; Gerard Messina

(57) ABSTRACT

A method for operating a parked motor vehicle, including the following steps: monitoring a passenger compartment of the motor vehicle and/or surroundings of the motor vehicle with the aid of one or multiple motor vehicle-internal sensor(s); transmitting monitoring data which are based on the monitoring via a wireless communication network to a mobile terminal; in response to a receipt of a control command, transmitted from the mobile terminal via the wireless communication network, for controlling one or multiple component(s) of the motor vehicle, controlling the one or the multiple component(s) of the motor vehicle as a function of the control command, the one or the multiple motor vehicle component(s) being selected from the following group of motor vehicle components: a motor vehicle lighting system, a motor vehicle horn, a motor vehicle-internal sensor. A corresponding device, a motor vehicle, and a computer program, are also described.

17 Claims, 1 Drawing Sheet

(51) Int. Cl.
*H04N 5/232* (2006.01)
*B60W 30/00* (2006.01)
*G06K 9/00* (2006.01)

(52) U.S. Cl.
CPC ......... *H04N 7/185* (2013.01); *G06K 9/00791* (2013.01); *G06K 9/00832* (2013.01); *H04N 5/23203* (2013.01); *H04N 5/23216* (2013.01)

(58) Field of Classification Search
CPC ......... B60W 2540/106; B60W 2540/12; F02N 11/0822; F02N 2200/0801; F02D 41/182; F02D 41/22; B60Q 1/44; B60Q 1/46
USPC .................................. 71/4, 70, 93
See application file for complete search history.

(56) References Cited

U.S. PATENT DOCUMENTS

| | | | | |
|---|---|---|---|---|
| 6,819,236 B2* | 11/2004 | Kawai | ............... | G08G 1/205 340/438 |
| 6,911,997 B1* | 6/2005 | Okamoto | ............... | B60R 1/00 348/148 |
| 7,869,824 B2* | 1/2011 | Min | ............... | G08C 17/02 455/418 |
| 7,920,944 B2* | 4/2011 | Gould | ............... | G07C 5/008 340/425.5 |
| 8,849,505 B2* | 9/2014 | Menard | ............... | B60J 7/0573 307/9.1 |
| 8,966,654 B1* | 2/2015 | Kwak | ............... | G06F 21/6245 340/439 |
| 9,013,579 B2* | 4/2015 | Ikeda | ............... | B60R 1/00 348/142 |
| 2003/0227377 A1 | 12/2003 | Cardenas | | |
| 2007/0197261 A1* | 8/2007 | Humbel | ............... | G06Q 30/00 455/558 |
| 2009/0051512 A1 | 2/2009 | Yu | | |
| 2009/0187300 A1* | 7/2009 | Everitt | ............... | G01C 21/3602 701/31.4 |
| 2011/0074561 A1 | 3/2011 | Mackjust et al. | | |
| 2012/0140073 A1 | 6/2012 | Ohta et al. | | |
| 2012/0162423 A1 | 6/2012 | Xiao et al. | | |
| 2014/0188367 A1* | 7/2014 | North | ............... | G07C 5/008 701/101 |
| 2015/0046022 A1* | 2/2015 | Bai | ............... | G07C 5/008 701/31.5 |
| 2015/0134226 A1* | 5/2015 | Palmer | ............... | B60W 40/10 701/101 |
| 2016/0173568 A1* | 6/2016 | Penilla | ............... | G06F 17/00 709/217 |
| 2016/0185253 A1* | 6/2016 | Heidrich | ............... | B60L 11/1885 701/2 |
| 2016/0189544 A1* | 6/2016 | Ricci | ............... | G07C 5/008 701/117 |
| 2016/0362084 A1* | 12/2016 | Martin | ............... | G01C 21/34 |
| 2018/0022187 A1* | 1/2018 | Connell | ............... | G06Q 10/06 701/2 |
| 2018/0217828 A1* | 8/2018 | Madrid | ............... | G06F 21/57 |
| 2019/0047514 A1* | 2/2019 | Brombach | ............... | B60R 25/2018 |
| 2019/0141756 A1* | 5/2019 | Lei | ............... | H04W 76/10 |

FOREIGN PATENT DOCUMENTS

| | | |
|---|---|---|
| DE | 102014221745 A1 | 4/2016 |
| DE | 102014224079 A1 | 6/2016 |
| WO | 2016187243 A1 | 11/2016 |

* cited by examiner

METHOD AND DEVICE FOR OPERATING A PARKED MOTOR VEHICLE

CROSS REFERENCE

The present application claims the benefit under 35 U.S.C. § 119 of German Patent Application No. DE 102017200165.8 filed in Jan. 9, 2017, which is expressly incorporated herein by reference in its entirety.

FIELD

The present invention relates to a method and to a device for operating a parked motor vehicle. The present invention furthermore relates to a motor vehicle and to a computer program.

BACKGROUND INFORMATION

For safety reasons, persons approaching a parked motor vehicle to enter it and drive away in it have an interest in receiving pieces of information regarding to what extent the surroundings of the motor vehicle are safe. In particular, such persons usually want to know whether a stranger has forced his or her way into the motor vehicle during their absence from the motor vehicle.

Moreover, there is a need to recognize already from a distance from the parked motor vehicle, i.e., when in particular no eye contact with the motor vehicle exists, whether someone impermissibly attempted to gain access to the parked motor vehicle, i.e., in particular to enter the parked motor vehicle.

German Patent Application No. DE 10 2014 224 079 A1 describes a method and a device for monitoring a vehicle situated within a parking facility.

German Patent Application No. DE 10 2014 221 745 A1 describes a method and a system for monitoring a vehicle in a parking facility.

SUMMARY

It is an object of the present invention to provide for efficiently operating a parked motor vehicle which is able to provide a person with pieces of information about surroundings of the parked motor vehicle and/or about a passenger compartment of the parked motor vehicle.

Advantageous embodiments of the present invention are described herein.

According to one aspect of the present, a method for operating a parked motor vehicle is provided, including the following steps:
  monitoring a passenger compartment of the motor vehicle and/or surroundings of the motor vehicle with the aid of one or multiple motor vehicle-internal sensors;
  transmitting monitoring data which are based on the monitoring via a wireless communication network to a mobile terminal;
  in response to a receipt of a control command, transmitted from the mobile terminal via the wireless communication network, for controlling one or multiple components of the motor vehicle, controlling the one or the multiple component(s) of the motor vehicle as a function of the control command, the one or the multiple motor vehicle component(s) being selected from the following group of motor vehicle components: a motor vehicle lighting system, a motor vehicle horn, a motor vehicle-internal sensor.

According to one further aspect, a device for operating a parked motor vehicle is provided, including:
  a communication interface for transmitting monitoring data via a wireless communication network to a mobile terminal, the monitoring data being based on a monitoring with the aid of a motor vehicle-internal monitoring unit for monitoring a passenger compartment of the motor vehicle and/or surroundings of the motor vehicle, the monitoring unit including one or multiple motor vehicle-internal sensors,
  the communication interface being designed to receive a control command, transmitted from the mobile terminal via the wireless communication network, for controlling one component or multiple components of the motor vehicle, and
  a control unit, which is designed, in response to a receipt of the control command transmitted from the mobile terminal via the wireless communication network, to control the one or the multiple component(s) of the motor vehicle as a function of the control command, the one or the multiple motor vehicle component(s) being selected from the following group of motor vehicle components: a motor vehicle lighting system, a motor vehicle horn, a motor vehicle-internal sensor.

According to another aspect, a motor vehicle is provided which includes the device for operating a parked motor vehicle.

According to another aspect, a computer program is provided, which includes program code for carrying out the method for operating a parked motor vehicle if the computer program is executed on a computer.

The present invention is based on the finding that the above object may be achieved in that monitoring data which are based on the monitoring are transmitted to the mobile terminal. The mobile terminal may thus process the monitoring data in a form which is comprehensible for a person carrying the mobile terminal so that the person in this way is able to monitor the motor vehicle surroundings and/or the motor vehicle passenger compartment from a distance.

For example, the mobile terminal displays an image of the motor vehicle surroundings and/or of the motor vehicle passenger compartment corresponding to the monitoring data.

The image corresponds to a sensor image, for example. A sensor image is a video image, for example, provided the sensor is a video sensor. If the sensor is a radar sensor, for example, the mobile terminal displays a radar image, for example. This applies correspondingly for further sensors.

The person carrying the mobile terminal may thus decide whether it is necessary for one or multiple motor vehicle components to be operated. If the person decides that one or multiple components of the motor vehicle must be operated, he or she transmits a corresponding control command for controlling the one or the multiple motor vehicle component(s) via the mobile terminal.

The one or the multiple motor vehicle component(s) is/are then controlled in response to a receipt of the control command transmitted accordingly from the mobile terminal via the wireless communication network.

It is provided according to the present invention that the one or the multiple motor vehicle component(s) is/are selected from the following group of motor vehicle components: a motor vehicle lighting system, a motor vehicle horn, a motor vehicle-internal sensor.

This means that the person carrying the mobile terminal is able to control the motor vehicle lighting system and/or the motor vehicle horn and/or one or multiple of the motor vehicle-internal sensors over the distance.

Thus, a remote control of these motor vehicle components takes place here.

The person may thus adequately respond to a potential hazard in the surroundings of the motor vehicle and/or in the passenger compartment of the motor vehicle.

This results in efficient protection for a person carrying a mobile terminal and approaching the parked motor vehicle.

On the one hand, the person recognizes based on the monitoring whether a stranger is potentially present in the passenger compartment and/or in the surroundings of the motor vehicle. And on the other hand, he or she may efficiently chase a possibly present stranger away by activating a motor vehicle lighting system or a motor vehicle horn. In particular, the stranger may be efficiently monitored by appropriately controlling the motor vehicle-internal sensor. For example, if the stranger moves, the person carrying the mobile terminal, using a corresponding control command, may control the motor vehicle-internal sensor in such a way that he or she tracks the stranger.

Controlling the motor vehicle lighting system includes in particular an activation of the motor vehicle lighting system, i.e., in particular an activation of one or multiple of the motor vehicle lighting units described hereafter.

A motor vehicle lighting system includes in particular one or multiple of the following motor vehicle lighting units: a high beam, a low beam, a side light, a parking light, a turn signal, a front fog light, an adaptive headlight, a daytime running light, a rear light, a brake light, a reflector, a license plate illumination unit, a rear fog light, a backup light, a side marker light, or a motor vehicle passenger compartment illumination unit.

Controlling the motor vehicle horn includes, for example, an activation of the motor vehicle horn.

Controlling the motor vehicle-internal sensor includes, for example, a pivoting of the sensor and/or a rotation of the sensor and/or a movement of the sensor in order to track a moving stranger in the motor vehicle passenger compartment and/or in the motor vehicle surroundings.

According to one specific embodiment, it is provided that the one or the multiple motor vehicle-internal sensor(s) include(s) a video camera so that the monitoring data include video images of the video camera, controlling including control of the video camera, controlling the video camera including one or multiple of the following steps: changing a focal length of a lens of the video camera, panning the video camera, rotating the video camera, moving the video camera, changing a recording parameter, in particular the exposure time and/or a diaphragm, of the video camera.

This in particular yields the technical advantage that the monitoring may be efficiently carried out. For example, by changing a focal length of a lens of the video camera, it is possible to deliberately zoom in on a stranger in the motor vehicle passenger compartment and/or in the motor vehicle surroundings.

Panning and/or rotating and/or moving the video camera in particular yields the technical advantage that a stranger may be efficiently tracked if he or she moves out of a recording range of the video camera.

Changing a recording parameter, in particular an exposure time and/or a diaphragm, of the video camera, for example, yields the technical advantage that the video images may be efficiently recorded. In this way, it is possible, for example, to efficiently respond to different lighting conditions.

According to one specific embodiment, it is provided that the group of motor vehicle components includes a drive engine of the motor vehicle, the control including a starting of the drive engine.

This, for example, yields the technical advantage that the parked motor vehicle is immediately ready to be driven away when the person carrying the mobile terminal and approaching the parked motor vehicle has arrived at the motor vehicle.

According to one specific embodiment, it is provided that a distance between the parked motor vehicle and the mobile terminal is ascertained, the ascertained distance being compared to a predefined distance threshold value, the monitoring data being transmitted to the mobile terminal only when the ascertained distance is smaller than or smaller than/equal to the predefined distance threshold value.

This, for example, yields the technical advantage that, by predefining the distance threshold value, it is possible to efficiently influence when the monitoring data are transmitted to the mobile terminal. In particular, by predefining a suitable distance threshold value it may be efficiently achieved that the person carrying the mobile terminal is only informed about the motor vehicle surroundings and/or the motor vehicle passenger compartment if the corresponding pieces of information are relevant for this person, i.e., in particular when this person is situated accordingly close to the motor vehicle.

According to one specific embodiment, it is provided that the one or the multiple motor vehicle-internal sensor(s) is/are a respective element selected from the following group of sensors:

a motor vehicle passenger compartment video camera, a motor vehicle outside video camera, a radar sensor, an ultrasonic sensor, a LIDAR sensor, a door sensor, a trunk lid sensor, a motion sensor, an infrared sensor, a magnetic sensor, a motor vehicle seat sensor and a steering wheel sensor.

This, for example, yields the technical advantage that the monitoring may be efficiently carried out.

A motor vehicle passenger compartment video camera and a motor vehicle outside video camera, respectively, within the meaning of the description include in particular a video sensor.

A motor vehicle passenger compartment video camera denotes a video camera which monitors the motor vehicle passenger compartment.

A motor vehicle outside video camera denotes a video camera which monitors the motor vehicle surroundings.

A video camera within the meaning of the description is a 3D video camera, for example.

A door sensor within the meaning of the description is designed to detect an opening of a motor vehicle door.

A trunk lid sensor within the meaning of the description is designed to detect an opening of a trunk lid of the motor vehicle.

A motion sensor within the meaning of the description is designed to detect a movement in the surroundings of the motion sensor.

A motor vehicle seat sensor within the meaning of the description is designed to detect when a person is situated on the motor vehicle seat corresponding to the motor vehicle seat sensor.

A steering wheel sensor within the meaning of the description is designed, in particular, to detect an actuation of the steering wheel.

According to one specific embodiment, it is provided that at least one of the one or of the multiple motor vehicle-internal sensor(s) is designed as a freely arranged sensor, so that the freely arranged sensor is not fixedly installed in the motor vehicle.

This in particular yields the technical advantage that the monitoring may be efficiently carried out. This means, in particular, that not only sensors which are fixedly arranged or fixedly installed in the motor vehicle or on the motor vehicle are used for monitoring, but additionally sensors which are freely arranged on the motor vehicle and thus have the technical advantage that they may be arranged or positioned only temporarily on the motor vehicle, which in particular facilitates a replacement.

According to one specific embodiment, the mobile terminal is a cell phone.

According to one specific embodiment, the mobile terminal is a watch, in particular a smart watch.

According to one specific embodiment, it is provided that the wireless communication network includes a mobile communication network and/or a WLAN communication network and/or a Bluetooth communication network.

A mobile communication network includes, for example, a GSM communication network and/or an LTE communication network.

This means, in particular, that a communication between the mobile terminal and the device is carried out wirelessly or cordlessly by radio, i.e., in particular by mobile communication and/or WLAN and/or Bluetooth.

The mobile terminal is in particular carried by a person.

This person carrying the mobile terminal is, for example, a future driver of the motor vehicle and/or a future occupant of the motor vehicle.

A stranger situated in the surroundings of the motor vehicle and/or in the passenger compartment of the motor vehicle is thus not the future driver and/or the future motor vehicle occupant.

According to one specific embodiment, the person carrying the mobile terminal approaches the parked motor vehicle.

To ascertain the distance between the parked motor vehicle and the mobile terminal, it is provided, for example, that position data, such as GPS position data, emitted from the mobile terminal via the wireless communication network are received, the distance being ascertained based on the received position data.

In one specific embodiment, it is provided that a distance between the parked motor vehicle and the mobile terminal is ascertained, the ascertained distance being compared to a predefined further distance threshold value, the monitoring of the motor vehicle passenger compartment and/or of the motor vehicle surroundings being started only when the ascertained distance is smaller than or smaller than/equal to the predefined further distance threshold value.

To ascertain the distance between the parked motor vehicle and the mobile terminal, it is provided, for example, that position data, such as GPS position data, emitted from the mobile terminal via the wireless communication network are received, the distance being ascertained based on the received position data.

In another specific embodiment, it is provided that the device for operating a parked motor vehicle is designed or configured to implement or carry out the method for operating a parked motor vehicle.

According to one specific embodiment, it is provided that the motor vehicle is designed or configured to implement or carry out the method for operating a parked motor vehicle.

According to one specific embodiment, it is provided that the method for operating a parked motor vehicle is implemented or carried out with the aid of the device for operating a parked motor vehicle.

Technical functionalities of the device for operating a parked motor vehicle are derived directly from corresponding technical functionalities of the method for operating a parked motor vehicle, and vice versa.

This means in particular that device features are derived from corresponding method features, and vice versa.

In one specific embodiment, the device includes the motor vehicle-internal monitoring unit for monitoring a passenger compartment of the motor vehicle and/or of surroundings of the motor vehicle, the monitoring unit including one or multiple motor vehicle-internal sensors.

In one specific embodiment, the motor vehicle includes the motor vehicle-internal monitoring unit for monitoring a passenger compartment of the motor vehicle and/or of surroundings of the motor vehicle, the monitoring unit including one or multiple motor vehicle-internal sensors.

In one specific embodiment, the motor vehicle includes one or multiple of the following motor vehicle components: a motor vehicle lighting system, a motor vehicle horn, a motor vehicle-internal sensor or motor vehicle-internal sensors, a drive engine.

Surroundings of the motor vehicle denotes in particular an area around the motor vehicle up to a maximum distance of, for example, 50 m, in particular 25 m, for example 15 m, in particular 10 m, for example 5 m, in particular 3 m.

In one specific embodiment, it is provided that the monitoring data exclusively correspond to the monitoring with the aid of the one or the multiple motor vehicle-internal sensor(s). According to this specific embodiment, the monitoring data thus do not include any data from motor vehicle-external sensors, which are situated within an infrastructure, for example, within which the motor vehicle is parked.

In one specific embodiment, it is provided that the monitoring data are stored. A storing is in particular an archiving.

This, for example, yields the technical advantage that the monitoring data may also be checked or analyzed at a later point in time, so that the instantaneously present situation may be analyzed again at a later point in time.

The monitoring data are preferably stored on the mobile terminal.

The monitoring data are preferably stored on a network server.

The monitoring data are preferably stored on the device.

According to one specific embodiment, the motor vehicle is parked within an infrastructure.

For example, the infrastructure is a parking facility, for example a parking garage or an underground parking garage.

The wording "respectively" comprises in particular the wording "and/or."

The present invention is described in greater detail below based on preferred exemplary embodiments.

DETAILED DESCRIPTION OF EXAMPLE EMBODIMENTS

Figure 1:
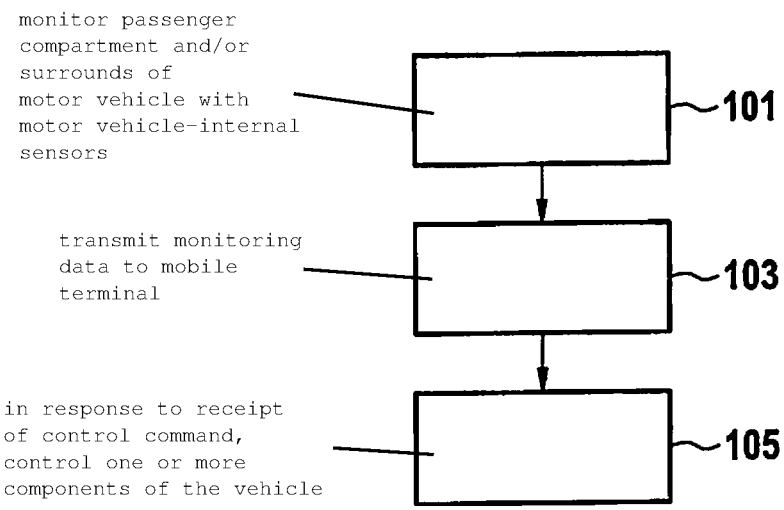
FIG. 1 shows a flow chart of a method for operating a parked motor vehicle.

FIG. 1 shows a flow chart of a method for operating a parked motor vehicle.

The method includes the following steps:
- monitoring 101 a passenger compartment of the motor vehicle and/or surroundings of the motor vehicle with the aid of one or multiple motor vehicle-internal sensor(s);
- transmitting 103 monitoring data which are based on the monitoring via a wireless communication network to a mobile terminal;
- in response to a receipt of a control command, transmitted from the mobile terminal via the wireless communication network, for controlling one or multiple components of the motor vehicle, controlling 105 the one or the multiple component(s) of the motor vehicle as a function of the control command, the one or the multiple motor vehicle component(s) being selected from the following group of motor vehicle components: a motor vehicle lighting system, a motor vehicle horn, a motor vehicle-internal sensor.

Figure 2:
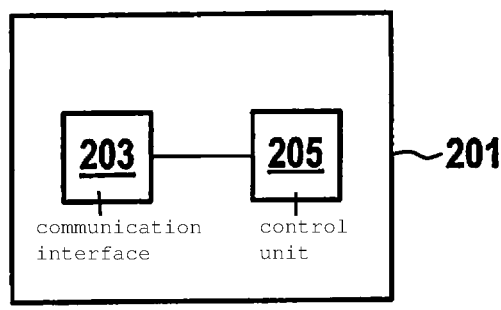
FIG. 2 shows a device for operating a parked motor vehicle.

FIG. 2 shows a device 201 for operating a parked motor vehicle.

Device 201 includes:
- a communication interface 203 for transmitting monitoring data via a wireless communication network to a mobile terminal, the monitoring data being based on a monitoring with the aid of a motor vehicle-internal monitoring unit for monitoring a passenger compartment of the motor vehicle and/or surroundings of the motor vehicle, the monitoring unit including one or multiple motor vehicle-internal sensor(s),
- the communication interface 203 being designed to receive a control command, transmitted from the mobile terminal via the wireless communication network, for controlling one component or multiple components of the motor vehicle, and
- a control unit 205, which is designed, in response to a receipt of the control command transmitted from the mobile terminal via the wireless communication network, to control the one or the multiple component(s) of the motor vehicle as a function of the control command, the one or the multiple motor vehicle component(s) being selected from the following group of motor vehicle components: a motor vehicle lighting system, a motor vehicle horn, a motor vehicle-internal sensor.

In one specific embodiment, device 201 includes a monitoring unit for monitoring a passenger compartment of the motor vehicle and/or surroundings of the motor vehicle, the monitoring unit including one or multiple motor vehicle-internal sensor(s).

Figure 3:
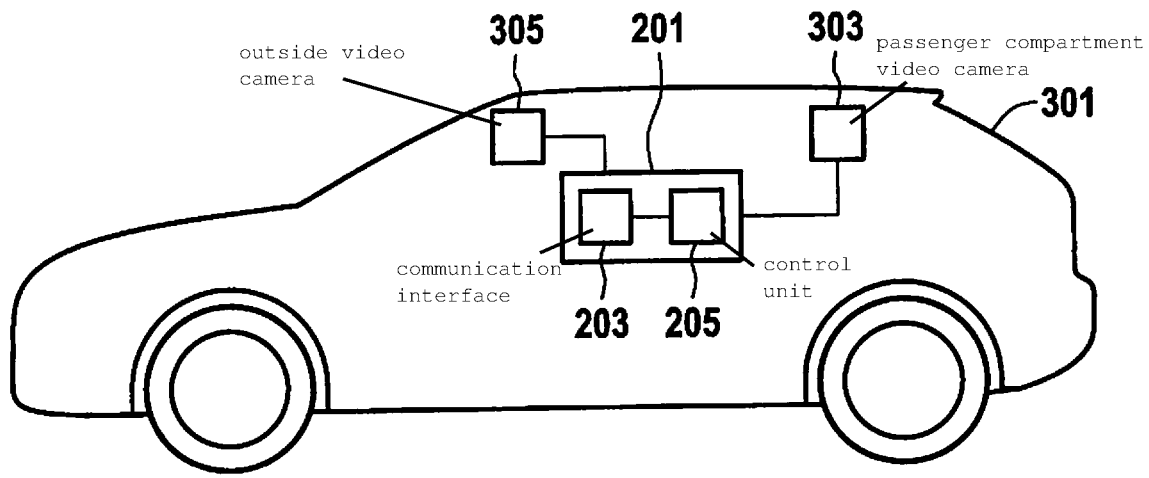
FIG. 3 shows a motor vehicle.

FIG. 3 shows a motor vehicle 301.

Motor vehicle 301 includes device 201 according to FIG. 2.

Motor vehicle 301 furthermore includes a motor vehicle passenger compartment video camera 303 and a motor vehicle outside video camera 305.

Motor vehicle passenger compartment video camera 303 monitors the passenger compartment of motor vehicle 301. Motor vehicle outside video camera 305 monitors surroundings of motor vehicle 301.

The video images of the two video cameras 303, 305 are transmitted with the aid of communication interface 203 to a mobile terminal via a wireless communication network.

The present invention thus in particular includes the idea of supplying a person carrying a mobile terminal and going to his or her parked motor vehicle with monitoring data (transmission of the monitoring data to the mobile terminal), these monitoring data being based on a monitoring of the passenger compartment and/or of the surroundings of the parked motor vehicle, using one or multiple motor vehicle-internal sensors. The basis of the monitoring of the surroundings and/or of the passenger compartment are thus data, which may also be referred to as sensor data, of motor vehicle-internal or motor vehicle-inherent sensors.

The person approaching the parked motor vehicle may, for example, transmit a control command via the wireless communication network to the motor vehicle, which includes the device for operating a parked motor vehicle, for example. Correspondingly, one or multiple component(s) of the motor vehicle are then controlled.

According to one specific embodiment, for example, it is provided that a motor vehicle lighting system is activated or switched on, which advantageously may improve monitoring. In particular when the monitoring is based on a monitoring of video cameras, better illuminated video images may be recorded as a result of an improved illumination of the surroundings and/or of the passenger compartment.

For example, a motor vehicle horn is activated, which may chase away a stranger, for example, who is impermissibly present in the motor vehicle passenger compartment.

For example, according to one specific embodiment it is provided that motor vehicle components, such as a drive engine of the motor vehicle, which are required for getting into the vehicle and driving off, are started prior to getting in.

For example, according to one specific embodiment it is provided that the group of motor vehicle components includes a motor vehicle door, in particular a driver side motor vehicle door, the controlling including an opening of the motor vehicle door. For this opening, a motor, in particular an electric motor, is provided, for example, which opens the motor vehicle door.

What is claimed is:

1. A method for operating a parked motor vehicle, comprising:
   - monitoring, with the aid of one or multiple motor vehicle-internal sensors, at least one of a passenger compartment of the motor vehicle and surroundings of the motor vehicle;
   - transmitting monitoring data which are based on the monitoring via a wireless communication network to a mobile terminal; and
   - in response to a receipt of a control command, transmitted from the mobile terminal via the wireless communication network, for controlling one or more components of the motor vehicle, controlling the one or more components of the motor vehicle as a function of the control command, the one or more motor vehicle components being selected from the following group of motor vehicle components: a motor vehicle lighting system, a motor vehicle horn, and a motor vehicle-internal sensor;
   - wherein the one or more motor vehicle-internal sensors include a video camera so that the monitoring data include video images of the video camera, the controlling including a controlling of the video camera, the controlling of the video camera including one or more of the following steps: changing a focal length of a lens of the video camera, panning the video camera, rotating the video camera, moving the video camera, changing an exposure time of the video camera, and, changing a diaphragm of the video camera.

2. A method for operating a parked motor vehicle, comprising:

monitoring, with the aid of one or multiple motor vehicle-internal sensors, at least one of a passenger compartment of the motor vehicle and surroundings of the motor vehicle;

transmitting monitoring data which are based on the monitoring via a wireless communication network to a mobile terminal; and in response to a receipt of a control command, transmitted from the mobile terminal via the wireless communication network, for controlling one or more components of the motor vehicle, controlling the one or more components of the motor vehicle as a function of the control command, the one or more motor vehicle components being selected from the following group of motor vehicle components: a motor vehicle lighting system, a motor vehicle horn, and a motor vehicle-internal sensor;

wherein a distance between the parked motor vehicle and the mobile terminal is ascertained, the ascertained distance being compared to a predefined distance threshold value, the monitoring data being transmitted to the mobile terminal only when the ascertained distance is smaller than or equal to the predefined distance threshold value.

3. The method as recited in claim 2, wherein the one or more components of the motor vehicle components includes a drive engine of the motor vehicle, and the controlling include a starting of the drive engine.

4. The method as recited in claim 2, wherein the one or more motor vehicle-internal sensors includes a respective element selected from the following group of sensors: a motor vehicle passenger compartment video camera, a motor vehicle outside video camera, a radar sensor, an ultrasonic sensor, a LIDAR sensor, a door sensor, a trunk lid sensor, a motion sensor, an infrared sensor, a magnetic sensor, a motor vehicle seat sensor, and a steering wheel sensor.

5. The method as recited in claim 2, wherein at least one of the one or more motor vehicle-internal sensors is a freely arranged sensor, so that the freely arranged sensor is not fixedly installed in the motor vehicle.

6. The method as recited in claim 2, wherein the monitoring data are stored on the mobile terminal.

7. The method as recited in claim 2, wherein the one or more motor vehicle-internal sensors include a video camera so that the monitoring data include video images of the video camera, the controlling including a controlling of the video camera, the controlling of the video camera including one or more of the following steps: changing a focal length of a lens of the video camera, panning the video camera, rotating the video camera, and moving the video camera.

8. The method as recited in claim 2, wherein the one or more motor vehicle-internal sensors include: a radar sensor and/or a Lidar sensor and/or an ultrasonic sensor.

9. A device for operating a parked motor vehicle, comprising:

a communication interface for transmitting monitoring data via a wireless communication network to a mobile terminal, the monitoring data being based on a monitoring with the aid of a motor vehicle-internal monitoring unit for monitoring at least one of a passenger compartment of the motor vehicle, and surroundings of the motor vehicle, the monitoring unit including one or more motor vehicle-internal sensors, the communication interface being designed to receive a control command, transmitted from the mobile terminal via the wireless communication network, for controlling one or more components of the motor vehicle; and a control unit, which is designed, in response to a receipt of the control command transmitted from the mobile terminal via the wireless communication network, to control the one or more components of the motor vehicle as a function of the control command, the one or more motor vehicle components being selected from the following group of motor vehicle components: a motor vehicle lighting system, a motor vehicle horn, and a motor vehicle-internal sensor;

wherein a distance between the parked motor vehicle and the mobile terminal is ascertained, the ascertained distance being compared to a predefined distance threshold value, the monitoring data being transmitted to the mobile terminal only when the ascertained distance is smaller than or equal to the predefined distance threshold value.

10. A motor vehicle, including the device for operating a parked motor vehicle, the device comprising:

a communication interface for transmitting monitoring data via a wireless communication network to a mobile terminal, the monitoring data being based on a monitoring with the aid of a motor vehicle-internal monitoring unit for monitoring at least one of a passenger compartment of the motor vehicle, and surroundings of the motor vehicle, the monitoring unit including one or more motor vehicle-internal sensors, the communication interface being designed to receive a control command, transmitted from the mobile terminal via the wireless communication network, for controlling one or more components of the motor vehicle; and a control unit, which is designed, in response to a receipt of the control command transmitted from the mobile terminal via the wireless communication network, to control the one or more components of the motor vehicle as a function of the control command, the one or more motor vehicle components being selected from the following group of motor vehicle components: a motor vehicle lighting system, a motor vehicle horn, and a motor vehicle-internal sensor;

wherein a distance between the parked motor vehicle and the mobile terminal is ascertained, the ascertained distance being compared to a predefined distance threshold value, the monitoring data being transmitted to the mobile terminal only when the ascertained distance is smaller than or equal to the predefined distance threshold value.

11. A non-transitory computer-readable storage medium on which is stored a computer program including program code for operating a parked motor vehicle, the computer program, when executed by a computer, causing the computer to perform:

monitoring, with the aid of one or multiple motor vehicle-internal sensors, at least one of a passenger compartment of the motor vehicle and surroundings of the motor vehicle;

transmitting monitoring data which are based on the monitoring via a wireless communication network to a mobile terminal; and in response to a receipt of a control command, transmitted from the mobile terminal via the wireless communication network, for controlling one or more components of the motor vehicle, controlling the one or more components of the motor vehicle as a function of the control command, the one or more motor vehicle components being selected from the following group of motor vehicle components: a motor vehicle lighting system, a motor vehicle horn, and a motor vehicle-internal sensor;

wherein a distance between the parked motor vehicle and the mobile terminal is ascertained, the ascertained distance being compared to a predefined distance threshold value, the monitoring data being transmitted to the mobile terminal only when the ascertained distance is smaller than or equal to the predefined distance threshold value.

12. A method for operating a parked motor vehicle, comprising:

ascertaining a distance between the motor vehicle and a mobile terminal;

comparing the ascertained distance to a predefined distance threshold value;

only when the ascertained distance is smaller than or equal to the predefined distance threshold, starting a monitoring, with the aid of one or multiple motor vehicle-internal sensors, of a passenger compartment of the motor vehicle and/or surroundings of the motor vehicle;

transmitting monitoring data which are based on the started monitoring via a wireless communication network to a mobile terminal; and in response to a receipt of a control command, transmitted from the mobile terminal via the wireless communication network, for controlling one or more components of the motor vehicle, controlling the one or more components of the motor vehicle as a function of the control command, the one or more motor vehicle components being selected from the following group of motor vehicle components: a motor vehicle lighting system, a motor vehicle horn, and a motor vehicle-internal sensor.

13. The method as recited in claim 12, further comprising:

receiving, from the mobile terminal, position data of the mobile terminal;

wherein in the ascertaining step, the distance between the motor vehicle and the mobile terminal are ascertained based on the received position data.

14. The method as recited in claim 13, wherein the position data is received from the mobile terminal via the wireless communication network.

15. The method as recited in claim 14, wherein the position data is GPS position data.

16. The method as recited in claim 12, wherein the one or more motor vehicle-internal sensors include a video camera so that the monitoring data include video images of the video camera, the controlling including a controlling of the video camera, the controlling of the video camera including one or more of the following steps: changing a focal length of a lens of the video camera, panning the video camera, rotating the video camera, and moving the video camera.

17. The method as recited in claim 12, wherein the one or more motor vehicle-internal sensors include: a radar sensor and/or a Lidar sensor and/or an ultrasonic sensor.

* * * * *